INVENTORS
J. P. LINDSEY
S. E. ELLIOTT

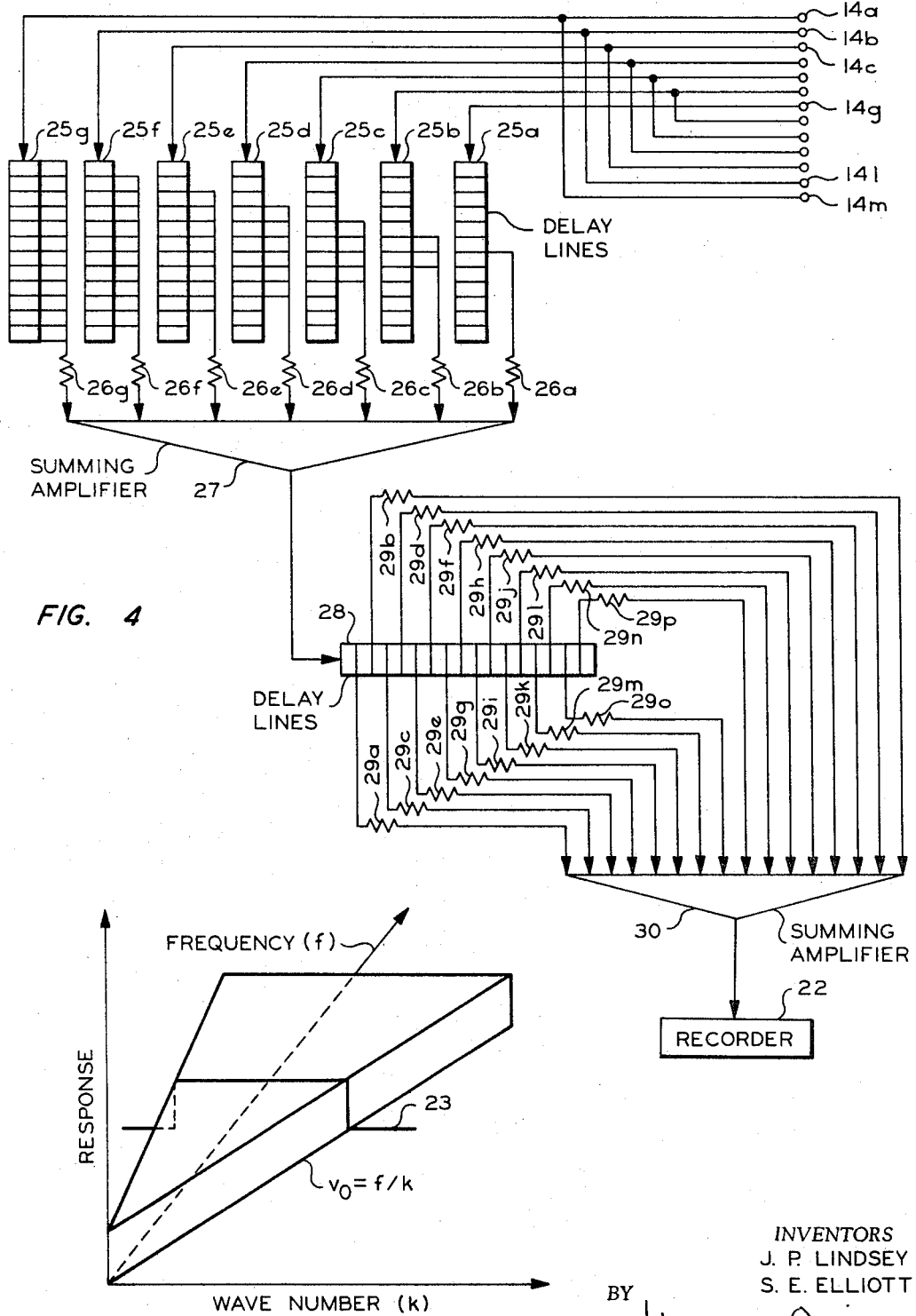

United States Patent Office 3,430,193
Patented Feb. 25, 1969

3,430,193
SEISMIC SIGNAL INTERPRETATION
Joe P. Lindsey and Sheldon E. Elliott, Bartlesville, Okla., assignors to Phillips Petroleum Company, a corporation of Delaware
Filed Sept. 5, 1967, Ser. No. 665,356
U.S. Cl. 340—15.5
Int. Cl. G01v 1/00
5 Claims

ABSTRACT OF THE DISCLOSURE

Seismic signals are generated sequentially at a plurality of first spaced points. These signals are received at one or more second points spaced from the first point. The received signals are velocity filtered with respect to the first points and with respect to the second points when a plurality of second points are employed.

---

Figure 2:
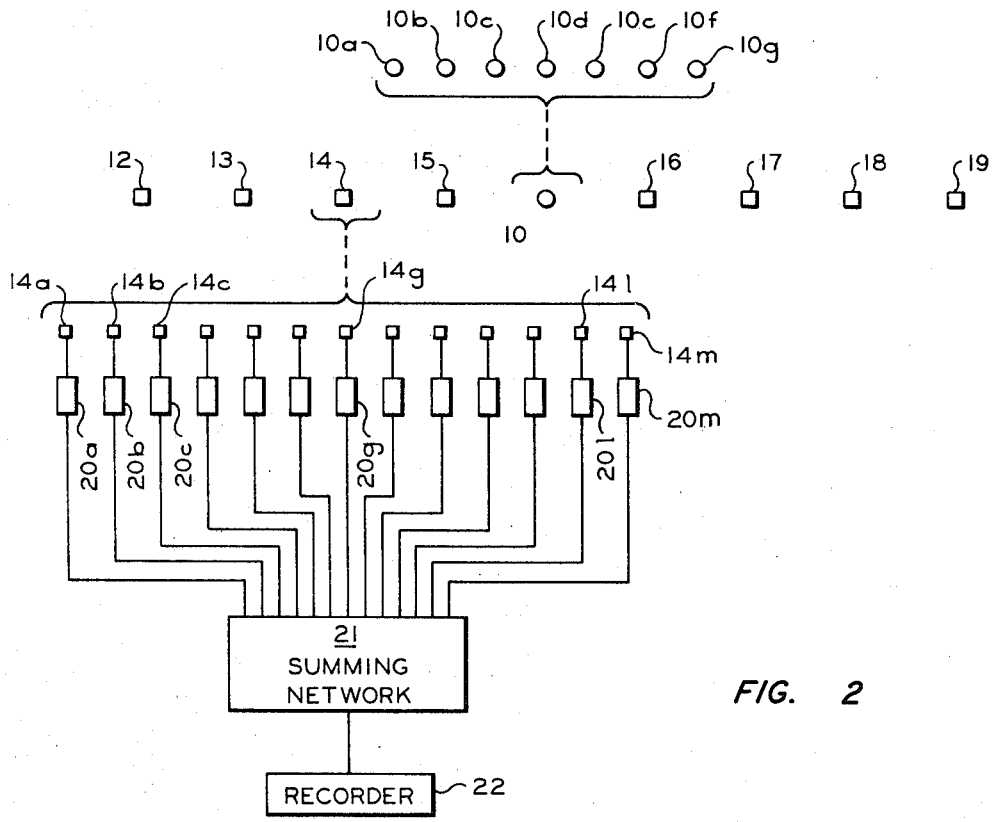

This invention relates to the detection and interpretation of seismic signals.

Seismic exploration relates to a method of obtaining information regarding subterranean earth formations by transmitting vibrations from a first point at or near the surface of the earth downwardly into the formations and measuring the deflected or reflected vibrations at one or more second points spaced from the first point. It is common practice to detonate an explosive charge to produce the vibrations, although other vibrating means can be employed. A plurality of seismometers normally are disposed in a predetermined geometric array in spaced relationship from the shot hole. By timing the arrivals of selected reflections from subterranean reflected beds, valuable information can often be obtained regarding the depth and slope of these beds. Unfortunately, however, other vibrations normally are present which tend to obscure the recognition of the desired reflected signals. In order to minimize these extraneous vibrations, a number of systems have been proposed which include electrical filter networks and the summing of multiple signals. However, there are still large areas wherein it is impossible to obtain accurate information because of extraneous noise vibrations.

One common procedure for enhancing the signal to noise ratio in seismic signals involves algebraically summing a plurality of signals. Summing signals in this manner tends to enhance common reflections whereas random noise vibrations tend to cancel one another. However, the common summed reflections generally are not as great as would be expected. This is due in part to the curvature of the reflected wave front and in part to differences in times of arrival of the wave front at adjacent seismometers. These and other factors often cause desired signal responses to interfere.

In accordance with this invention a novel seismic exploration procedure is provided whereby signals are filtered and summed in such a manner as to enhance desired reflections while minimizing extraneous vibrations. In one embodiment this is accomplished by space time filtering signals which are received by a plurality of seismometers located at each detector station. The resulting signals are summed to provide a single composite trace. The same procedure is repeated a number of times by imparting vibrations sequentially to the earth at a plurality of points spaced from one another adjacent the initial vibration imparting point. The plurality of composite records thus obtained are then velocity filtered with respect to the shot point spacing so as to provide a final composite record which has been velocity filtered both with respect to the seismometer locations and the shot point locations. In another embodiment, the order of filtering is reversed; and in still another embodiment, filtering is performed only with respect to the shot point spacings. The space time filtering employed is such that impulses which have an apparent or trace velocity across the seismometer array greater than a predetermined value are enhanced and impulses having an apparent or trace velocity less than a predetermined value are suppressed. As employed herein, the terms "apparent" or "trace" velocity refer to the velocity of an impulse as recorded by two spaced seismometers. This apparent or trace velocity is that velocity at which the impulse appears to move along a straight line connecting the seismometers at the surface level. For horizontally traveling ground waves, the apparent or trace velocity is the actual velocity. For reflected waves from subterranean formations, the apparent or trace velocity is based on the difference in times of arrival of the wave front at the two seismometers. This "velocity" is considerably higher than the actual velocity of the reflected wave.

Accordingly, it is an object of this invention to provide an improved method and apparatus for interpreting seismic signals.

A further object is to provide a method of seismic prospecting which involves velocity filtering of seismic signals received at adjacent seismometers and signals produced from adjacent shot points.

Figure 1:
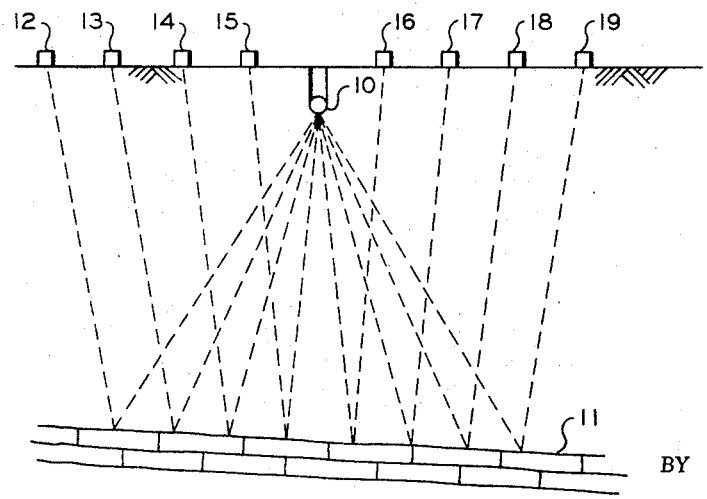

Other objects, advantages and features of the invention will become apparent to one skilled in the art from the following detailed description, taken in conjunction with the accompanying drawing in which:

FIGURE 1 is a schematic representation of a typical seismic exploration system in which this invention can be employed. FIGURE 2 is a schematic representation of shot point and seismometer locations employed in this invention, together with apparatus employed to filter and sum the received signals. FIGURE 3 is a graphical representation of the response characteristics of the filters employed in the circuit of FIGURE 2. FIGURE 4 illustrates a specific embodiment of the filtering and summing apparatus of FIGURE 2.

Referring now to the drawing in detail and to FIGURE 1 in particular, vibrations are imparted to the earth at a first shot point 10 by detonating an explosive charge or by the use of another type of vibration imparting means. The resulting vibrations travel downwardly and are reflected back to the surface of the earth from a subterranean reflecting bed, such as 11. These reflected vibrations are detected at a plurality of receiving stations 12 to 19 which are located on both sides of the shot point. Although only eight receiving stations are illustrated in order to simplify the drawing, a greater number of these stations normally is employed. While it is not necessary that these stations be located on both sides of the shot point, a greater amount of information is obtained from each shot point by this procedure. In accordance with this invention, each seismometer station of FIGURE 1 is provided with a plurality of vibration responsive elements which are spaced from one another in a direction extending away from the shot point. For example, 13 individual seismometers 14a, 14b . . . 14m are positioned at receiving station 14 of FIGURE 1. This is illustrated schematically in FIGURE 2 wherein the 13 individual seismometers are shown as being located in the area occupied by station 14. It is preferred that the centermost seismometer 14g be located at the center of receiving station 14. Each of the remaining receiving stations of FIGURE 1 is provided with a similar group of individual seismometers. These seismometers can extend in both directions from the center point of each station, but generally do not overlap the seismometers of adjacent stations. In a typical exploration system of this invention, the seismometer stations can be approximately 600 feet apart. The seismometer spread at each station can thus extend over a distance of some 600 feet, although other distances can be employed. While 13 seismometers are shown at station 14, a greater number can often be employed to advantage in accordance with this invention. For example, a typical station may have 25 seismometers.

The seismometers illustrated in FIGURE 2 are devices which provide electrical output signals which vary in amplitude in accordance with the amplitudes of the vibrations received. The output signal from seismometer 14a is transmitted through a filter 20a to the first input of a summing network 21. The outputs of seismometers 14b, 14c . . . 14m are transmitted through respective filters 20b, 20c . . . 20m to network 21. The output signal from network 21 is applied to a recorder 22. The individual filters and summing network 21 provide velocity filtering of the signals received by the individual seismometers. The filters are designed such that the summed output from the plurality of seismometers does not contain impulses whose apparent or trace velocity is less than a preselected value.

The selection and design of these filters will be described with reference to FIGURE 3 which is a plot of relative response B versus wave number $k$ and frequency $f$. All velocities greater than plus or minus $v_o$ are represented by the pie-shaped solid in the three-dimensional diagram. All those velocities less than $v_o$ are represented by the area outside of the pie-shaped solid. A section 23 through the pie-shaped solid at a constant frequency will be a relative response versus wave length diagram. The three-dimensional solid is the desirable response function for the filter network.

The response B of three-dimensional pie-shaped solid illustrated in FIGURE 3 can be approximated by the following expression:

$$B\left(\frac{-|f|d}{v_o}, \frac{|f|d}{v_o}\right) = \sum_{n=-N}^{N}\left[2\frac{|f|d}{v_o}\left(\frac{\sin \pi 2n\frac{|f|a}{v_o}}{2\pi n\frac{|f|d}{v_o}}\right)\right]\cos 2\pi nkd \quad (1)$$

wherein $f$ is frequency, $d$ is the spacing between adjacent seismometers, $v_o$ is the cut-off velocity, i.e., the trace or apparent velocity below which value all signals will be viewed as noise and rejected and above which velocity all signals will be viewed as valid signals and transmitted, $n$ is the number assigned to the seismometer, i.e., from $-N$ to $+N$, which in FIGURE 2 is from $-6$ to $+6$, and $k$ is the wave number (reciprocal of wave length).

The sum of the outputs from an odd number of seismometers without the filter of this invention can be represented as follows:

$$\sum_{n=-N}^{N} R_n = \left(\sum_{n=-N}^{N}[1]\cos 2\pi nkd\right)\cos 2\pi ft \quad (2)$$

wherein $k$, $n$, $d$, and $f$ are as defined above and $t$ is the time as measured from an origin which is the instant at which the maximum of the ground disturbance (assumed to be a sinusoidal wave) passes the center seismometer 14g, going from left to right in FIGURE 2.

In order to make the output signal from summing network 21 of FIGURE 2 approximate the pie-shaped configuration of FIGURE 3, it is necessary to replace the constant unity coefficient in brackets in expression (2) with:

$$A_o = \frac{2|f|d}{v_o}; \text{ where } n = o$$

$$A_n(f) = \left[2\frac{|f|d}{v_o}\left(\frac{\sin 2\pi n\frac{|f|d}{v_o}}{2\pi n\frac{|f|d}{v_o}}\right)\right], n = N, -1, 1, -, N \quad (3)$$

Thus, the ideal response $\overline{R}$, with the filters of this invention, can be represented by the following expression:

$$\overline{R} - \sum_{n=-N}^{N}\overline{R}_n = \cos 2\pi ft\cdot\left[\sum_{n=-N}^{N}A_n(f)\cos 2\pi nk\right] =$$

$$(\cos 2\pi ft)B\left(\frac{|f|d}{v_o}, \frac{|f|d}{v_o}\right) \quad (4)$$

In order to obtain the weighted value for each individual filter of FIGURE 2, a Fourier inversion is performed, as set forth in Campbell and Foster, "Fourier Integrals for Practical Applications," Van Nostrand & Co., 1942, p. 77. This gives the time transforms of the Fourier series, which can be represented as follows:

$$A_n(t) = \frac{1}{\pi 2}\cdot\frac{\frac{d}{v_o}}{\left(\frac{nd^2-t^2}{v_o}\right)} = \frac{1}{\pi 2}\frac{\xi}{(n^2\tau^2-t^2)}; n \neq o \quad (5)$$

$$A_o(t) = -\frac{1}{\pi 2}\cdot\frac{\frac{d}{v_o}}{t^2} + \delta(t) = -\frac{\xi}{\pi^2 t^2} + \delta(t) \quad (6)$$

wherein $t$ = the time as measured from seismometer 14g at the instant of time at which the maximum of the ground disturbance passes seismometer 14g going to the left, and $\tau$ is equal to $d/v_o$, which represents the cutoff wavelet stepout between seismometers, and $\delta(t)$, is a unit Dirac delta function as defined in Campbell and Foster.

In the above expressions (5) and (6). $A_n$ is the filter response required for each of the respective filters of FIGURE 2. $A_o$ is the filter required for 20g, and so forth.

By the above system broad band wavelets having a sweep velocity greater than $v_o$ will be passed and broad band wavelets having a sweep velocity less than $v_o$ will be suppressed. Thus, if much of the seismic noise consists of broad band wavelets having a sweep velocity less than $v_o$, the filter system employed provides a natural means for separation of signal from noise on the basis of sweep velocity. In general, increasing the number of seismometers at each station increases the resolution.

The foregoing description of the filters has assumed an odd number of seismometers at each seismometer station. However, the invention can also be applied to a seismometer station which has an even number of seismometers. The filter responses for such a system will now be described.

The sum of the outputs of an even number of seismometers at a seismometer station can be approximated by the following expression:

$$2\left\{\sum_{n=1}^{N}\cos 2\pi kd[1/2+(n+1)]\right\}\cos 2\pi ft \quad (7)$$

wherein $n$, $N$, $k$, $d$, $f$ and $t$ are as defined above. Further simplification of this expression gives the following:

$$\overline{R} = 2\sum_{n=1}^{N}R = \left\{\frac{\sin\left[2\pi\left(\frac{kd}{2}\right)(2N)\right]}{\sin 2\pi\left(\frac{kd}{2}\right)}\right\}\cos 2\pi ft \quad (8)$$

The desired boxcar function for an even number of seismometers can be expressed:

$$B = 2\left\{\sum_{n=}^{N}\left[\frac{2\sin \pi k_o d(2n-1)}{\pi(2n-1)}\right]\cos 2\pi kd[1/2+(n-1)]\right\} \quad (9)$$

wherein B is the desired boxcar function, $n$, N and $kd$ are defined above, and $K_o$ is the value of $k$ at the cutoff wave length.

The Fourier coefficients can be expressed as follows:

$$A_n = 4 \frac{\sin n\pi k_0 d}{n\pi} \quad (10)$$

wherein $k_0$ and $d$ are defined above.

Thus, the filter for each seismometer response in an even number array will have the function represented by the Fourier transform of:

$$A_n(f) = \frac{\sin 2\pi \frac{|f|}{v_0} d[\frac{1}{2} + (n-1)]}{\pi[\frac{1}{2} + (n-1)]} \quad (11)$$

This Fourier transform can be obtained as has been set forth above with reference to an odd number of seismometers.

The individual filters of FIGURE 2 can be designed to provide the responses described above. This can readily be accomplished, for example, by converting the output signals from the seismometers to digital form and applying these signals to a digital computer which is programmed to provide the desired output responses. As an alternative, the filters can be constructed from conventional electrical circuit elements. One example of a filter network of this type is illustrated in FIGURE 4.

The output signal from seismometer 14g is applied to the input of a first conventional tapped delay line 25a. The output signals from seismometer 14f and 14h are combined and applied to the input of a second delay line 25b. Similarly, the outputs of the remaining seismometers are combined in pairs and applied to the inputs of the additional delay lines illustrated, the outputs of seismometers 14a and 14m being applied to the input of delay line 25g. These delay lines are provided with a plurality of spaced taps so that output signals can be removed with selected time delays, the delays between adjacent taps on each delay line generally being of the order of a few milliseconds. Delay line 25g is provided with 13 output taps. These taps are connected and applied through an input resistor 26g to the first input terminal of a summing amplifier 27. The single center tap of delay line 25a is applied to amplifier 27 through a resistor 26a. The three centermost taps of delay line 25b are applied through a resistor 26b to amplifier 27. Similarly, progressively larger numbers of pairs of central terminals of delay lines 25c, 25d . . . 25f are applied through respective resistors 26c, 26d . . . 26f to amplifier 27.

The delay lines thus far described provide conventional "box car" outputs, of progressively longer duration proceeding from delay line 25a to delay line 25g. The inputs, except to delay line 25a, can be paired in the manner illustrated because the associated input seismometers are spaced equal distances from seismometer 14g and thus require filters having the same general response, as described previously.

The summed output signal from amplifier 27 is applied to the input of an additional delay line 28. Delay line 28 is provided with a plurality of spaced taps which are applied to respective inputs of a second summing amplifier 30 through respective resistors 29a, 29b . . . 29p.

As previously mentioned, time delay lines 25a to 25g can be conventional tapped delay lines which provide delayed pulse outputs when an input pulse is applied. The individual delay lines thus provide "box car" output signals of progressively greater length, proceeding from delay line 25a to delay line 25g. Resistors 26a to 26g have progressively smaller values in the order named. These resistors are selected so that the product of the resistor value and the number of taps on the associated delay line is a constant for each delay line. For example, resistors 26a, 26b . . . 26g can have respective values (in megohms) of 15, 5, 3 . . . 0.6. Delay line 28 and the output circuit associated therewith are selected so as to provide a zero phase derivative filter. This can be accomplished, for example, by use of a tapped delay line of the type described in U.S. Patent 3,201,706, R. G. Piety, Aug. 17, 1965. Delay line 28 and the associated summing resistors are selected such that the filter has a response of the form illustrated in FIGURE 1 of the Piety patent when a single input pulse is applied to the input. As described in the Piety patent, the values of the resistors and the taps selected can be adjusted until the network provides the desired output response when single input pulses are applied. The Cardinal function response, which is of the form sin $X/X$ of the zero phase derivative filter, provides the corresponding portion of the expressions discussed above.

In the seismic exploration procedure of this invention, vibrations are imparted to the earth initially at a point which has thus far been described generally as shot point 10. As illustrated in FIGURE 2, point 10 actually comprises a plurality of spaced individual shot points such as those indicated by numerals 10a, 10b . . . 10g. These individual shot points are located in the general region of 10 but are spaced from one another. In the example described above wherein the seismometer spread extends over a distance of from 600 feet, the individual shot points can likewise extend over a distance of 600 feet at the region of point 10. Vibrations are imparted to the earth subsequently at the individual shot points illustrated in FIGURE 2. It will be assumed, for example, that vibrations initially are imparted at point 10a and subsequently at the remaining points. The filtering and recording procedure previously described is repeated for each individual shot point. This results in a single composite trace being recorded at each of the seismometer stations for each of the individual shot points. In the embodiment illustrated in FIGURE 2, seven composite signals are thus obtained at each seismometer station. While seven shot points have been described for purposes of illustration, in actual practice a larger number of shot points normally would be employed such as thirteen, for example. The next step of the procedure of this invention involves velocity filtering of the individual composite records with respect to the different shot points to produce a single composite signal. This is carried out by exactly the same procedure as described above wherein the distance between individual shot points is the distance $d$ in the foregoing equations. All of the original composite signals are reproduced from the recorder (which can be a magnetic recorder) to form the filter inputs when this second compositing step takes place. This is equivalent to considering each seismometer location a "shot point" and the original shot points the "seismometer locations."

If desired, the two steps described above can be carried out in the reverse order. This involves recording the outputs of the individual seismometers initially and then reproducing these signals for the compositing steps. As still another alternative, the velocity filtering can be performed only with respect to the different seismometer locations. In this procedure, signals received sequentially at each seismometer location are filtered in combination with respect to the distances between shot points.

In carrying out seismic exploration in accordance with the procedure of this invention, all of the steps thus far described are repeated at a plurality of shot locations extending along the surface of the earth. The resulting composite signals which are obtained can be used in any conventional manner to provide information regarding the slopes of subterranean reflected beds. In one specific method of application, these composite signals can further be combined by the common reflection procedure disclosed in U.S. Patent 3,040,833, Mendenhall et al., June 26, 1962. As an alternative, the signals can further be combined in a seismic reflection search procedure such as described in U.S. Patent 3,213,412, Piety et al., Oct. 19, 1965. An important advantage of this method resides in the fact that the composite output signal obtained at each seismometer station is statistically independent from the outputs of all of the other stations. The cut-off velocity employed in designing the filters can be of the order of 15,000 to 30,000 feet per second, or even higher, depending on the formation characteristics. In any event, this cut-off velocity should be such as to eliminate horizontally propagated signals while passing reflections.

While this invention has been described in conjunction with presently preferred embodiments, it should be evident that it is not limited thereto.

What is claimed is:

1. The method of seismic surveying which comprises sequentially imparting vibrations to the earth at a plurality of first points which are located adjacent the surface of the earth and which are spaced horizontally from one another and from a plurality of second points which are located adjacent the surface of the earth in horizontal spaced relationship with one another; detecting the resulting vibrations which are received at said second points and establishing a plurality of signals which are representative of such detected vibrations; filtering and combining the signals resulting from vibrations received at said plurality of second points from each of the imparted vibrations so as to provide a plurality of first composite signals which contain only vibrations which have an apparent horizontal velocity across said second points greater than a preselected value; and filtering and combining said plurality of first composite signals so as to provide a second composite signal which contains only vibrations which have an apparent horizontal velocity across said first points greater than a preselected value.

2. The method of claim 1 wherein said first composite signals are obtained by passing the signals to be filtered and combined through respective boxcar filters, the individual responses thereof being proportional in width to the distances that the second points are spaced from one another, summing the output signals from the boxcar filters, and passing the resulting summed signal through a zero phase derivative filter; and wherein said second composite signal is obtained by passing the first composite signals through respective boxcar filters, the individual responses thereof being proportional in width to the distances that the respective first points are spaced from one another, summing the output signals from the last-mentioned boxcar filters, and passing the resulting summed signal through a zero phase derivative filter.

3. The method of seismic surveying which comprises sequentially imparting vibrations to the earth at a plurality of first points which are located adjacent the surface of the earth and which are spaced from one another and from a second point which is located adjacent the surface of the earth; detecting in sequence the resulting vibrations which are received at said second point and establishing a plurality of signals which are representative of the detected vibrations; and filtering and combining said signals so as to provide a composite signal which contains only vibrations which have an apparent horizontal velocity across said first points greater than a preselected value, and filtering and combining comprising passing the signals through respective boxcar filters, the individual responses thereof being proportional in width to the distances that the respective first points are spaced from one another, summing the output signals from the boxcar filters, and passing the resulting summed signals through a zero phase derivative filter.

4. The method of seismic surveying which comprises sequentially imparting vibrations to the earth at a plurality of first points which are located adjacent the surface of the earth and which are spaced horizontally from one another and from a plurality of second points which are located adjacent the surface of the earth in horizontal spaced relationship with one another; detecting the resulting vibrations which are received at said second points and establishing a plurality of signals which are representative of such detected vibrations; filtering and combining the signals received at each of said second points from the vibrations imparted sequentially at said first points so as to provide a plurality of first composite signals which contain only vibrations which have an apparent horizontal velocity across said first points greater than a preselected value; filtering and combining said plurality of first composite signals so as to provide a second composite signal which contains only vibrations which have an apparent horizontal velocity across said first points greater than a preselected value.

5. The method of claim 4 wherein the first mentioned and said second composite signals are obtained by passing the signals to be filtered and combined through respective boxcar filters, the individual responses thereof being proportional in width to the distances that the first points are spaced from one another, summing the output signals from the boxcar filters, and passing the resulting summed signal through a zero phase derivative filter; and wherein said final composite signal is provided by passing the first composite signals through respective second boxcar filters, the individual responses thereof being proportional in width to the distances that the respective second and third points are spaced from one another, summing the output signals from the last-mentioned boxcar filters, and passing the resulting summed signal through a zero phase derivative filter.

References Cited

UNITED STATES PATENTS 3,274,541   9/1966   Embree _____ 340—15.5

OTHER REFERENCES

Pie slice, "The Pie Slice Process," Geophysical Service Inc., Technical Bulletin 63–1, 1963, pp. 1–14.

RICHARD A. FARLEY, *Primary Examiner.*

C. E. WANDS, *Assistant Examiner.*

UNITED STATES PATENT OFFICE
CERTIFICATE OF CORRECTION

Patent No. 3,430,193                                      February 25, 1969

Joe P. Lindsey et al.

It is certified that error appears in the above identified patent and that said Letters Patent are hereby corrected as shown below:

Column 8, line 3, "and" should read -- said --.

Signed and sealed this 7th day of April 1970.

(SEAL)
Attest:

Edward M. Fletcher, Jr.

Attesting Officer

WILLIAM E. SCHUYLER, JR

Commissioner of Patents